3,354,223
1-CHLORO-2-METHOXYOCTAFLUORO-
CYCLOHEXENE-1
Richard F. Sweeney, Randolph Township, Morris County, N.J., assignor to Allied Chemical Corporation, New York, N.Y., a corporation of New York
No Drawing. Filed Feb. 28, 1964, Ser. No. 348,277
1 Claim. (Cl. 260—611)

This invention relates to the production of an ether, 1-chloro-2-methoxyoctafluorocyclohexene-1.

This compound has utility as a solvent and sealing adjuvant for films of a copolymer of trifluorochloroethylene and vinylidene fluoride. For example, when a saturated solution of the film in the subject compound is placed between the surfaces of the films to be sealed, substantially greater seal strengths than those attained for untreated film can be effected at the same sealing temperatures. A temperature of less than 400° F. may be used for effective sealing of the treated film whereas temperatures greater than 400° F. are needed to effectively seal the untreated film. The untreated film generally melts before a sufficiently high temperature to attain a seal strength equivalent to that of the treated film is reached.

An object of this invention is to provide a novel chemical compound, 1-chloro-2-methoxyoctafluorocyclohexene-1. Another object is to educe a novel process for the preparation of 1-chloro-2-methoxyoctafluorocyclohexene-1. Other objects and advantages of this invention will be apparent hereinafter.

In accordance with the invention, 1-chloro-2-methoxyoctafluorocyclohexene-1 having the formula:

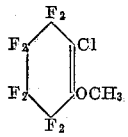

is prepared by reacting 1,2-dichlorooctafluorocyclohexene having the following formula:

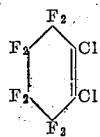

with an alkali metal methoxide.

The reaction is illustrated by the following equation:

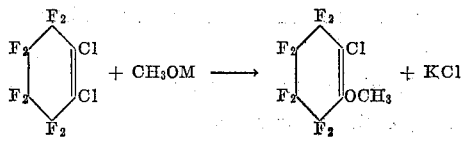

wherein M is an alkali metal.

The reaction can be carried out in an ordinary Pyrex flask or other glass lined reaction vessel. Such reaction vessel can be optionally equipped with a stirrer, a thermometer, a dropping funnel and heating means.

The most practical reaction medium is methanol since it forms one of the reactants, the alkali metal methoxide, when mixed with an alkali metal hydroxide. Other polar solvents such as dioxane, tetrahydrofuran, dimethylformamide, and tetrahydrothiophene-1,1-dioxide can be used. Where solvents other than methanol are used, the alkali metal methoxide is added to the olefin solution to effect the reaction.

The preferred mode of carrying out the reaction is as follows:

1,2-dichlorooctafluorocyclohexene can be first dissolved in methanol and the methanolic solution of olefin introduced into the reaction vessel. A solution of an alkali metal hydroxide, preferably potassium hydroxide, in methanol, is then added to the solution in the reaction vessel. This methanolic solution of potassium hydroxide is defined as a solution wherein the molar ratio of methanol to potassium hydroxide is greater than 1:1, i.e., a molar excess of methanol is present in the methanolic solution of potassium hydroxide.

The preferred potassium hydroxide will be referred to in the description of the process although the same steps and conditions can be used for other alkali metal hydroxides such as sodium and lithium.

Because of the high degree of reactivity of 1,2-dichlorooctafluorocyclohexene and potassium methoxide, it is preferable to add the solution of potassium hydroxide in methanol dropwise with vigorous stirring.

The amounts of methanolic potassium hydroxide which is added to the methanolic solution of 1,2-dichlorooctafluorocyclohexene is based on the molar ratio of potassium hydroxide to 1,2-dichlorooctafluorocyclohexene. The ratio can be from about .1 to about 3 mols of potassium hydroxide per mol of 1,2-dichlorooctafluorocyclohexene and is preferably about 0.5 to about 1 mol of potassium hydroxide per mol of 1,2-dichlorooctafluorocyclohexene. The optimum molar ratio is 1:1. When there is a molar excess of potassium hydroxide, the excess potassium methoxide formed reacts with 1-chloro-2-methoxyoctafluorocyclohexene-1 and lowers the yield. The desirability of a dilute system is apparent from this reactivity of potassium methoxide with 1-chloro-2-methoxyoctafluorocyclohexene-1. If, as the methanolic solution of potassium hydroxide is added to the olefin, the molar ratio at any point in the reaction mixture exceeds 1:1, this undesirable effect, i.e., the potassium methoxide-ether reaction, takes place lowering the yield of ether. The more dilute the methanolic solution, the more remote the possibility of this undesirable action taking place. Where potassium methoxide is used by itself, the same molar ratios apply as for potassium hydroxide.

The only limit on an excess of methanol, i.e., an amount of methanol greater than one mol of methanol per mol of potassium hydroxide, is the bound of practicality. A great excess is desirable since the greater the amount of methanol and consequently the more dilute the solution the less opportunity for reaction of the potassium methoxide with the desired ether. Separate methanolic solutions of olefin and potassium hydroxide can be prepared prior to introduction into the reaction vessel as described; or the potassium hydroxide can be added to a methanolic solution of the olefin; or a methanolic solution of potassium hydroxide can be added to the olefin. The first procedure, i.e., the preparation of separate methanolic solutions of olefin and potassium hydroxide before introduction into the reaction vessel, is preferable and most practical. To obtain the highest possible yield there should be at least one mol of methanol for each mol of potassium hydroxide; however, any amount of methanol less than one mol will produce the desired product in lower yield, e.g., an amount of .1 mol of methanol can be used.

Since the addition of methanolic potassium hydroxide to 1,2 dichlorooctafluorocyclohexene results in an exothermic reaction, the dropwise additions avoids a sudden rise in temperature. The temperature can be maintained in the range of about 0° to about 90° C. and is preferably maintained in the range of about 25° to about 55° C.

The reaction is essentially completed when all of the methanolic solution of potassium hydroxide has been added; however, it is desirable to stir and heat for a short period following the methanolic potassium hydroxide addition to assure as complete a reaction as possible.

The process can be carried out under either atmospheric, sub-atmospheric or super-atmospheric pressure, but atmospheric pressure is preferable and most practical. The atmosphere in which the reaction takes place is preferably air, but can be any inert gas.

After the reaction is concluded, the contents of the reaction vessel can then be added to water. The water insoluble layer is then separated and dried. On distillation, the desired product, 1-chloro-2-methoxyoctafluorocyclohexene-1 is recovered.

The following examples illustrate the present invention. Parts and percentages are by weight.

*Example I*

A glass reaction vessel, fitted with a magnetic stirrer, thermometer, and a dropping funnel was charged with 26 parts of 1,2-dichloroocetafluorocyclohexene dissolved in 39.6 parts of anhydrous methanol. A solution of 5.6 parts of potassium hydroxide in 79.2 parts of methanol was added dropwise with vigorous stirring. The maximum temperature of the reaction mixture during this addition period was 44° C. When the addition was completed, the reaction mixture was heated to 55° C. for ½ hour. The mixture was then added to about 400 parts of water and the water insoluble layer was separated and dried. This water insoluble layer was then distilled and 1-chloro-2-methoxyoctafluorocyclohexene-1 (B.P. 135–136° C.) was recovered.

*Example II*

The apparatus described in Example I was charged with 51 parts of 1,2-dichlorooctafluorocyclohexene dissolved in 39.6 parts of methanol. A solution of 11.2 parts of potassium hydroxide in 79.2 parts of methanol was added dropwise with vigorous stirring. The maximum temperature reached during the addition period was 45° C. At the end of the addition period, the mixture was heated to 55° C. for ½ hour. The mixture was added to 500 parts of water and the water insoluble layer was separated and dried. This water insoluble layer was then distilled to give 27 parts of 1-chloro-2-methoxyoctafluorocyclohexene-1.

*Analysis.*—Calcd. for $C_7H_3OClF_8$: Percent Cl, 12.3; percent F, 52.3. Found: Percent Cl, 12.2; percent F, 52.8.

*Example III*

The apparatus used was a glass reaction vessel fitted with a condenser, stirrer, thermometer and a dropping funnel. The flask was charged with 748 parts of 1,2-dichlorooctafluorocyclohexene dissolved in 100 parts of methanol. A solution of 142 parts of potassium hydroxide in 400 parts of methanol was added, dropwise and with vigorous stirring, to the flask contents over a four hour period. The maximum temperature of the flask contents over this period was 55° C. The reaction mixture was diluted with water and 750 parts of an oily layer was separated and dried. 406 parts of 1-chloro-2-methoxyoctafluorocyclohexene-1 was obtained on distillation of the oily layer.

*Example IV*

1-chloro-2-methoxyoctafluorocyclohexene-1 was tested as a sealing adjuvant for a thermoplastic film composed of a copolymer of about 96% trifluorochloroethylene and about 4% vinylidene fluoride. A saturated solution of this film was prepared by refluxing 1-chloro-2-methoxyoctafluorocyclohexene-1 with said film, cooling the mixture to room temperature and decanting the solution from the undissolved film. The strength of the seal prepared by heat sealing two films of the copolymer together with the solution was compared with the strength of the seal prepared by heat sealing the films together without using the solution as shown in Table I. An impulse heat sealer was used. The impulse heat sealer was a Sentinel Impulse Sealer manufactured by Packaging Industries, Inc. of Montclair, New Jersey.

TABLE I

| | Temp., °F. | Pressure, p.s.i. | Dwell Time, sec. | Wgt. to Effect Rupture, grams |
|---|---|---|---|---|
| Films heat sealed without the use of 1-chloro-2-methoxyoctafluorocyclohexene-1 | 325 | 30 | 3 | <10 |
| Films heat sealed with a solution in 1-chloro-2-methoxyoctafluorocyclohexene-1 | 325 | 30 | 3 | >1,500 |

The seal strength was determined by applying the indicated weight (weight to effect rupture) to effect pulling apart of a 1 sq. in. area of sealed film. The film ruptured at a point away from the sealed area. Temperature in ° F. was the heat sealing temperature used. Pressure in p.s.i. was the sealing pressure. Dwell Time, sec. is defined as the length of time in seconds during which the heat and pressure were applied to effect the seal.

I claim:

A compound having the formula:

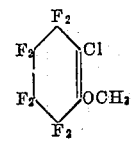

References Cited

UNITED STATES PATENTS 2,613,228   10/1952   Ruh _____ 260—611

OTHER REFERENCES

Henne et al.: Jour. Indian Chem. Soc., vol. 30, No. 12 (1953), pp. 809–813.

LEON ZITVER, *Primary Examiner.*

H. MARS, *Assistant Examiner.*